(12) United States Patent
Vicknair et al.

(10) Patent No.: US 7,937,307 B1
(45) Date of Patent: May 3, 2011

(54) ELECTRONIC CHECK PRESENTMENT SYSTEM AND METHOD HAVING AN ITEM SEQUENCE CAPABILITY

(75) Inventors: Tom Vicknair, Kingwood, TX (US); Sam Beard, Spring, TX (US); Richard Norman, Dallas, TX (US); Mark Riggleman, Katy, TX (US); Max Roycroft, Rowlett, TX (US); Dick Feagin, Houston, TX (US); Cliff Day, Houston, TX (US); Paul Fielding, Dallas, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 81 days.

(21) Appl. No.: 12/538,448

(22) Filed: Aug. 10, 2009

Related U.S. Application Data

(63) Continuation of application No. 09/728,340, filed on Dec. 1, 2000, now Pat. No. 7,584,125.

(60) Provisional application No. 60/214,128, filed on Jun. 26, 2000.

(51) Int. Cl.
*G06Q 40/00* (2006.01)

(52) U.S. Cl. ............... 705/35; 705/40; 705/42; 705/45; 709/238; 707/829; 235/379; 382/140; 382/306; 370/401

(58) Field of Classification Search .................... 705/35, 705/45, 42, 40; 235/379; 382/140, 306; 709/238; 707/829; 370/401
See application file for complete search history.

(56) References Cited

U.S. PATENT DOCUMENTS

| | | | | | |
|---|---|---|---|---|---|
| 5,532,464 | A | * | 7/1996 | Josephson et al. | 235/379 |
| 5,602,936 | A | * | 2/1997 | Green et al. | 382/140 |
| 5,666,490 | A | * | 9/1997 | Gillings et al. | 709/238 |
| 5,678,046 | A | * | 10/1997 | Cahill et al. | 707/829 |
| 5,870,725 | A | * | 2/1999 | Bellinger et al. | 705/45 |
| 5,874,717 | A | * | 2/1999 | Kern et al. | 235/379 |
| 5,930,778 | A | * | 7/1999 | Geer | 705/45 |
| 6,192,165 | B1 | * | 2/2001 | Irons | 382/306 |
| 7,181,430 | B1 | * | 2/2007 | Buchanan et al. | 705/45 |
| 7,792,753 | B1 | * | 9/2010 | Slater et al. | 705/45 |

* cited by examiner

*Primary Examiner* — Harish T. Dass
(74) *Attorney, Agent, or Firm* — Goodwin Procter LLP

(57) ABSTRACT

A system and method for performing Electronic Check Presentment (ECP) processing. The system and method employ digital imaging techniques to digitally image the physical checks as they arrive subsequent to posting of the ECP items. The images are electronically linked to the data records that represent the checks. During the proofing process, in which the data records for the ECP items are validated against the data records for the physical items, the records are updated such that the posting date and ISN number for the data records for the physical items reflect the posting date and ISN number of the ECP items. As the digital image of the check is electronically linked to the data records, the image is thus carries the posting date and ISN of the ECP item.

14 Claims, 6 Drawing Sheets

ELECTRONIC CHECK PRESENTMENT SYSTEM AND METHOD HAVING AN ITEM SEQUENCE CAPABILITY

CROSS-REFERENCE TO RELATED APPLICATION

This application is a continuation of U.S. patent application Ser. No. 09/728,340, filed Dec. 1, 2000, ELECTRONIC CHECK PRESENTMENT SYSTEM AND METHOD HAVING AN ITEM SEQUENCE CAPABILITY, which itself claims priority to Provisional Patent Application No. 60/214,128, filed Jun. 26, 2000, the disclosure of both of which are incorporated by reference in their entirety.

FIELD OF THE INVENTION

The present invention generally relates to retail banking systems and methods and more particularly to banking systems and methods for processing Electronic Cash Presentment transactions.

BACKGROUND OF THE INVENTION

In retail banking, one of the major tasks facing banking institutions is the processing of paper checks. As customers present checks to their own bank institution for deposit, it is the responsibility of the bank to "clear" the check prior to depositing the money represented by the check into the customer's account. If the check is written against an account within the same banking institution, it is known as an "on-us" check, and the process of clearing the check is straightforward. The account against which the check is drawn is debited for the amount of the check and the funds are transferred to the account of the customer that presented the check.

A more common occurrence is that the check is drawn against a different bank (the "drawee bank") and the customer's bank must communicate the presentment of the check to the drawee bank in order to receive the funds for its customer. Historically, this communication was accomplished by the bank, at the end of each business day, by dividing all of the presented checks into bundles for each separate drawee bank. The bundles were shipped to the respective drawee banks, along with a cover letter known as a Cash Letter. The Cash Letter contained a summary of the checks contained in the shipment and represented the dollar value of the checks that the customer's bank expected from the drawee bank. As is readily appreciated, this manual process was very time consuming and resulted in the funds not being deposited into the customer's account for seven to ten days.

The Expedited Funds Availability Act of 1987 placed a limit on the amount of time that a bank may hold funds after a customer has presented a check. Typically, two days is allowed for a check drawn on a local banking institution and three days for non-local banks. In order to comply with the law, banks automated the processes associated with the processing of checks. One of the biggest improvements employed by banks was the use of high speed sorters that automatically scan the checks using a Magnetic Ink Character Recognition (MICR) line imprinted on the bottom of the checks. Using the MICR line, the sorters are able to create a database containing all the information associated with the check (e.g., drawee bank, account, amount . . . ) as well as automatically separating the checks into the previously described bundles. As part of the automatic check processing function, the banks were able to generate an electronic version of the Cash Letter known as an Electronic Cash Letter or an Electronic Cash Presentment (ECP).

FIG. 1 illustrates the process once a transmitting bank 10 has generated the ECP with respect to the checks that it received that day. FIG. 1 represents the process exercised with respect to a single drawee bank 20, but the same process occurs with respect to each drawee bank to which the transmitting bank 10 transmits an ECP. The transmitting institution creates the ECP 15 as described above and transmits the electronic file 15 to the drawee bank 20. This transmission is typically accomplished via a secure communication (e.g., leased line) using Electronic Data Interchange (EDI) format. As previously described, the ECP 15 contains all of the information about each check in order for the drawee bank to post and reconcile the items (the checks).

The standard ECP processing 25 includes posting the item to the account on which the check is written. This is illustrated in the connection between ECP processing 25 and the Demand Deposit Account (DDA) system 30. The process of posting is when the funds are actually debited against the check writer's account and no longer available for use. The funds are actually transmitted to the transmitting institution in an end of day process of known as settlement (not shown).

One end product of the standard ECP processing 25 is an electronic database 35 that contains entries for each item in the ECP. The entries for each item includes the decisions made with respect to the each item (e.g., debited, returned for insufficient funds . . . ) The MICR line information, the date the item was posted to the drawee's account and an Item Sequence Number (ISN). As the items of the ECP are processed in the stand processing procedure, they are each assigned a unique Item Sequence Number (ISN). The ISN is unique for each item and serves as an internal index by which the bank can track the item. After the end of the standard ECP processing 25, the financial processing of the items is essentially completed.

At some point later in the day (or perhaps even the next day), the transmitting bank 10 sends the physical items 40 represented in the ECP to the drawee bank 20. The physical items (the checks) are conventionally known as Paper To Follow items. Upon receipt of the physical items, a Paper To Follow (PTF) process is run to make a legal record of the items, and to justify the entries of the ECP 15.

As part of the Paper To Follow processing, the drawee bank generates a microfilm image of the item for the bank's internal record keeping requirements. In the standard Microfilm process 45, each of the physical items are assigned another unique ISN. The second unique ISN number assigned during the microfilm process is different from the first ISN associated with the ECP entry during the standard ECP processing 25. This second ISN number is physically imprinted on the microfilm containing the item. Because the image is captured on microfilm, there is no way to alter this second ISN to match the first ISN associated with the corresponding ECP entry. The microfilms for the physical items are stored in a microfilm archive 47.

In the proofing process 50, the physical items are matched to items contained in the original ECP. As previously described, each of the ECP items are represented in the database 35. In order to achieve processing efficiencies, conventional sorter systems used in the proofing process 50 require that the physical items are presented in the exact same order as they were found in the ECP 15. Naturally, this causes great heartache if somehow the physical items were dropped and became out of order before the sorting process. The requirement that the items be in the same order stems from the fact that the proofing process is performed in real time. As each of the physical items are matched to the ECP items in database 35, a Cross Reference file 55 is built to correlate the ISNs of the ECP items to ISNs of the physical (now microfilmed) items. After the microfilming 45 and proofing processes 50 are completed, statements 60 are sent to the customer 65. The statements 60 contain the actual physical checks written by the customer 65.

At some point later in time, the customer 65 may have a question on a particular item. For example, the customer 65 may have lost his copy of the check and requires a copy of the check to present to his utility company for proof of payment. In a business environment, an insurance company might require a copy of a claim check that it wrote to one of its customers that is now disputing the payment. Typically, the customer 65 will contact the customer service center 70 within the bank.

In researching the check, the customer service representative 70 first checks the archive 75. Where a bank 20 has established a process 550 for digitally imaging non-ECP items that are presented to it (e.g., on-us checks), those images will be stored in a digital archive 75. However, if the item was processed through the ECP process described above, the image of the check will not be found in archive 75. This is because the process of posting of the ECP items and the process for creating the images associated with the ECP items are separate and distinct from the process 550 of generating the images for non-ECP items. For example, as depicted in FIG. 1, images of the ECP items are and retained via a standard microfilming process 45.

After the service representative 70 has determined that the item is not contained in the archive 75, the representative 75 knows that the check was most likely an ECP item that was microfilmed. One significant problem with searching for the microfilm image is that the microfilm image of the check will not be found on the posting date that the customer sees on his statement. This is because the posting date relates the posting of the ECP item, not the date on which the physical item was processed and microfilmed. In order to find the microfilm image of the check, the customer service representative 70 has to consult the cross reference file 55 in order to determine where in the microfilm archive 47, the image of the requested check can be found. Once found in the archive 47, a copy of the check is generated from the microfilm and is sent to the customer 65. No currently available processes for managing information lends itself to a useful integration of the output from the two processes (one being the output from process 550 and the other being the archival output from the processes surrounding the posting of an ECP item).

The prior art methods described above suffer from several significant drawbacks. The sorting process by the transmitting bank when generating the ECP 15 must essentially be repeated when the drawee bank 20 receives the physical items. The generation of the two ISNs, one associated with the ECP item and one with the microfilmed item, requires the generation of the cross reference file 55 in order to match the two items at a later date. The sorters in the drawee bank 20 require that the physical items be in the same order as they were processed in the sorters at the transmitting bank 10.

It is therefore an object of the present invention to solve at least the above-described problems with the systems and methods of the prior art.

SUMMARY OF THE INVENTION

The present invention solves the problems of the prior art in ECP processing by taking advantage of digital imaging techniques. Rather than imaging the physical checks using traditional microfilm techniques, the present invention digitally images the checks and links the images to the data records that represent the checks.

In accordance with a first embodiment of the present invention, the ECP processing by a receiving bank takes place the same as with the prior art methods. During the proofing process, in which the data records for the ECP items are validated against the data records for the Paper to Follow physical items, the records are updated such that the posting date and ISN number for the Paper to Follow records reflect the posting date and ISN number of the ECP items. As the digital image of the check is electronically linked to the data records, the image thus carries the posting date and ISN of the ECP item.

The method of the present invention was physically impossible with the system and method of the prior art since the microfilm image of the physical check was stamped with the date and ISN from the processing the physical item and could not be thereafter changed to reflect the date and ISN of the ECP item.

In an alternative embodiment of the present invention, the transmitting bank undertakes the task of imaging the physical items and transmitting to the receiving bank an enhanced ECP file. The enhanced ECP file contains all of the data regarding the ECP items that were traditionally included in the ECP, but also contains the images of the physical items linked to the data records. This method saves both time and money since the receiving bank no longer has to perform the duplicate task of capturing the physical items as they are received from the transmitting bank.

In a further alternative embodiment of the present invention, the transmitting bank takes the enhanced ECP file as described above and transmits it to a separate common storage facility. The transmitting bank performs this method for each bank to which it would have traditionally sent an ECP. The drawee banks then access the common storage facility and retrieve the data record and images required to process the ECP.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
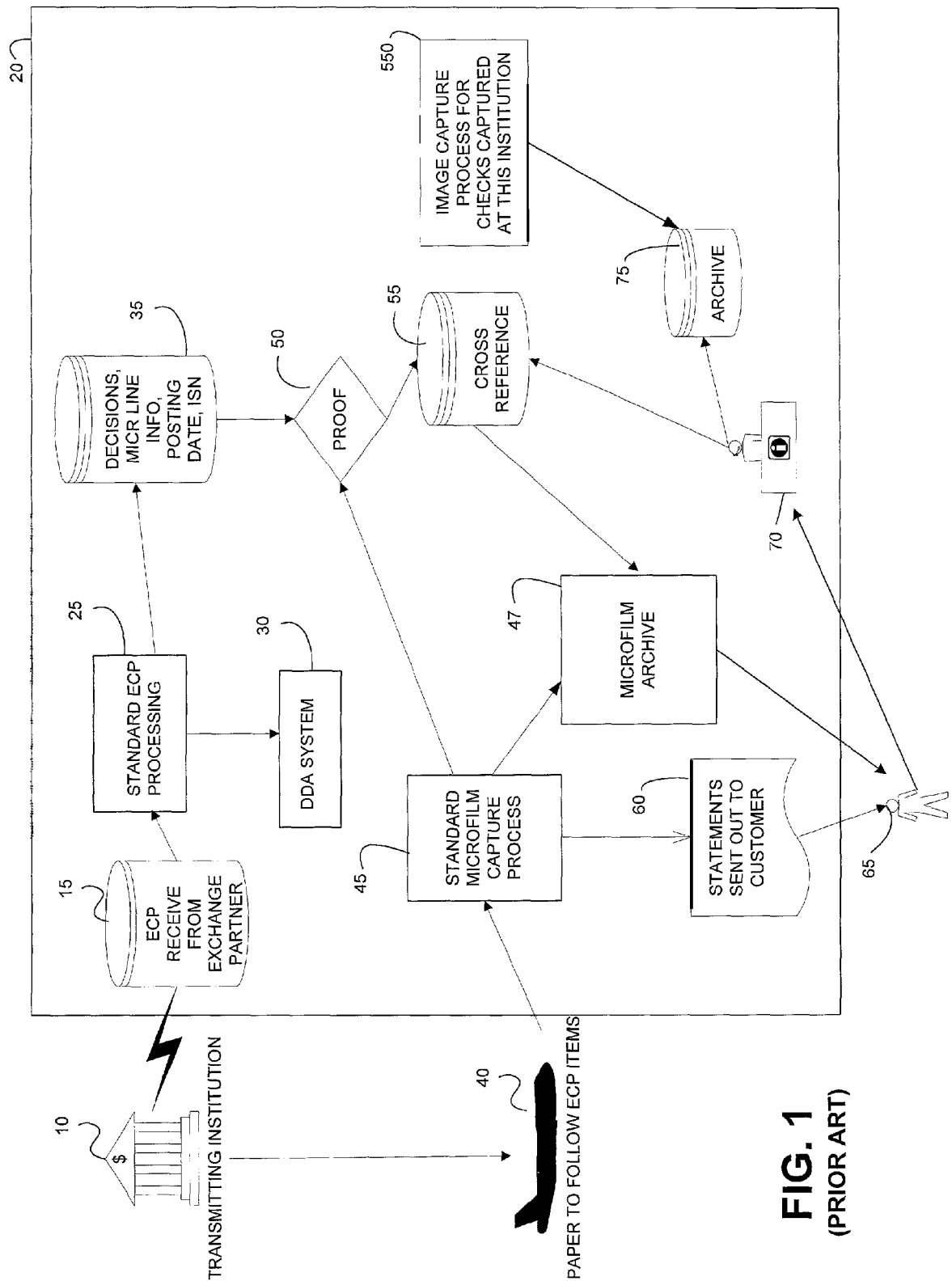
FIG. 1 illustrates a system and method of the prior art.
Figure 2:
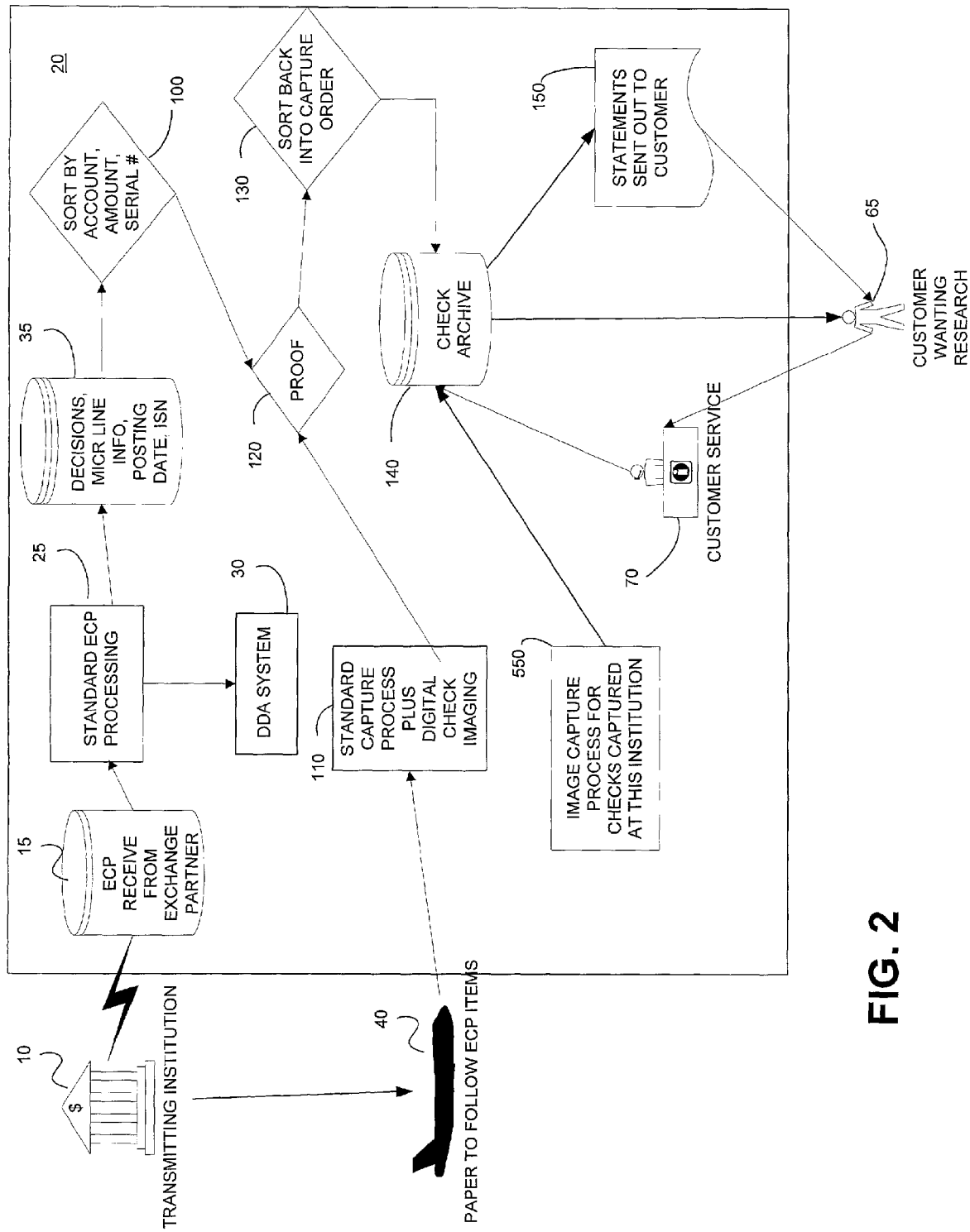
FIG. 2 depicts a first embodiment of the present invention using a single ISN number to reference both the ECP items and the image of the physical item.

FIG. 2 illustrates a first embodiment of the system and method of the present invention. As described previously with respect to the prior art of FIG. 1, the transmitting bank generates the ECP file 15 and transmits it to the drawee bank 20.

The drawee bank performs it's standard ECP processing 25 to post the items to the DDA system 30 and to generate the item database 35. As with the prior art, the ECP processing 25 generates the item database 35 that contains all the information with respect to each ECP item, including a unique ISN number.

Once all of the information for each of the ECP items has been captured in the database 35, the database is then sorted 100 into a deterministic order according to selected fields. In the preferred embodiment, the sorting is by account, amount, and check serial number. This sorting process 100 is performed in order to facilitate the proof process 120 described below.

When the paper items 40 arrive at a later time (typically the next day) a Paper To Follow (PTF) process is run to make a legal record of each of the items, and justify the entries of the ECP. The capture process 110 of the present invention is significantly different form the capture process of the prior art. The physical items are still run through a sorter in order to capture the MICR line information, but unlike the prior art, process 110 captures a digital image of each item instead of a microfilm image. Such high-speed digital imaging systems are known in the art, but have not been applied in the ECP processing environment as is the case in the present invention.

In the digital image environment of process 110, the capture process is standard with the following exception: if a sorter is going to reject an item, it is routed to a process path where that item may be held for on-line operator review. In one embodiment, the high-speed sorter is not held up, so reject items are routed to special re-pass pocket. Such items are then re-passed through a slower sorter, or a sorter on which it is not an impact to exercise a hold function.

A significant advantage of the system of the present invention is that since the captured image is digital, it can be displayed at an operator's terminal. The operator thus has the ability to immediately key in the required information from an item rejected by the sorter, without ever having to have access to the physical item itself. In this way, the digital image environment of capture 110 will never have a rejected item unless the item is extremely physically damaged so as to make handling of that item by mechanical means not possible.

A further advantage of the prior art that will become more evident as described below, is that a new ISN does not have to be generated for each physical item in the batch 40 from the transmitting bank 10. Although such an ISN can be generated by the sorters used in the capture process 110, this ISN can be disregarded once the internal processes of the capture processes 110 have been completed.

The proofing process 120 according to the present invention is a significant improvement over the prior art techniques. Again, during the proofing process the items that were included in the ECP file 15 from the transmitting bank 10 are checked against the physical items 40 that were received by the bank 20. In the prior art, it was required that sequence of the items in the file generated by the capture process 45 (see FIG. 1) were in the exact same order as the items in the ECP 15 that was received from the transmitting bank 10. If the items were not in the same order, the proofing process 50 of the prior art would fail.

In the present invention, when the records of the physical items (resulting from the capture process 110) are checked against the ECP items (contained in the database 35, which has been sorted by process 100), the order of the paper items no longer matters. As noted above, the database 35 was sorted 100 into a deterministic order according to selected fields (e.g., account, amount, and check serial number). Thus, regardless of the order in which the physical items are presented, they may now be directly found in the database 35. As described above, the prior art required the physical items 110 to be presented in the same order as the received ECP file 25 (for example if a physical item was out of order, then in the prior art it is possible that one might have to search the entire database 35). In contrast to the prior art, in the method of the present invention, since the order of database 35 is known by the sorting process 100, one can directly determine if an item is, or is not, part of the database 35.

In the most significant improvement over the prior art, the electronic file from the capture process 110 that documents the physical items that were received, contains the digital images of the physical items. This is significant since records associated with the digital images can be updated to reflect the standard ECP processing 25. Specifically, as the digital images are matched to ECP items, the digital images are assigned the posting ISN and posting date given to the item when it was presented via the ECP process.

This assignment of the ISN for the ECP item to the physical item was impossible with the prior art since the microfilm image of the prior art was imprinted with the ISN assigned during the microfilm capture process (step 45 in FIG. 1). Once this ISN number was assigned and imaged with the physical item, that second ISN was the only manner in which that image could be referenced. This was the reason that the cross-reference (file 55 in FIG. 1) had to be generated in the prior art, to correlate the ISN for an item in the ECP and the ISN associated with the microfilm image of the physical item.

Furthermore, as mentioned above, the electronic record of the physical item (which now includes the image of the item itself) is updated by the present invention to reflect the posting date of the ECP item. This is significant with respect to future inquiries by customers regarding an item. Specifically, when a customer received its statement (60 in FIG. 1), the statement informed the customer about the posting date of the item. This posting date related to the posting of the ECP item. But when the bank customer service 70 went to search for an item, the microfilm of the item carried a date that was typically one, two or three days after the posting date. The customer service 70 representative then had to perform a search process to resolve the dates, and correctly match the microfilm image to the item being requested by the customer. This effort by the customer service representative 70 added time, resources and eventually money in providing customers with information and copies of items posted against their accounts.

The present invention solves these problems with prior art by processing all Paper to Follow items in a strictly digital format. Most significantly, the digital images of the items, and the data records associated with the images are modified to reflect the financial processing (e.g., the posting date and posting ISN) that has occurred with respect to an item. Since the digital records and images of the physical items are now linked directly to the ECP items, searching for an image of an item is a direct process.

Once the proofing process 120 has been completed, the records (an associated images) are sorted in process 130 back into the order in which they were captured during the ECP processing 25. This is done to maintain the workflow processes that were developed around the existing paper-based systems (i.e., all the computer files appear the same to any subsequent down-stream processes that might access them).

Another significant advantage of the system and process of the present invention is that check archive 140 of the present invention contains all of the information related to a check. Most significantly, the archive 140 contains the digital images of all of the physical items that were received by the bank 20

(that is to say, since archive 40 is an integrated digital archive, other standard non-ECP processes 550 that capture digital items may also store those images in the archive 140). This integrated archive 140 allows the bank 20 to generate the statements 150 to the customers directly from the digital archive 140. The statements 150 according to the present invention include a thumbnail image of the check that is retrieved from the digital archive 140 for inclusion in the statement.

When the customer 65 requests research with respect to an item on her statement, she contacts customer service 70 as she did in the prior art. Unlike the prior art, the customer service representative 70 is now able to search the single digital archive 140 and find the item under the posting date that the customer sees. Furthermore, all of the information associated with the item, either from the ECP processing 25 or the standard capture process 110, is included in the single integrated database for reference by the Customer service representative 70. This improvement over the prior art significantly reduces the time that customer service 70 requires to resolve an issue with respect to item.

Figure 3:
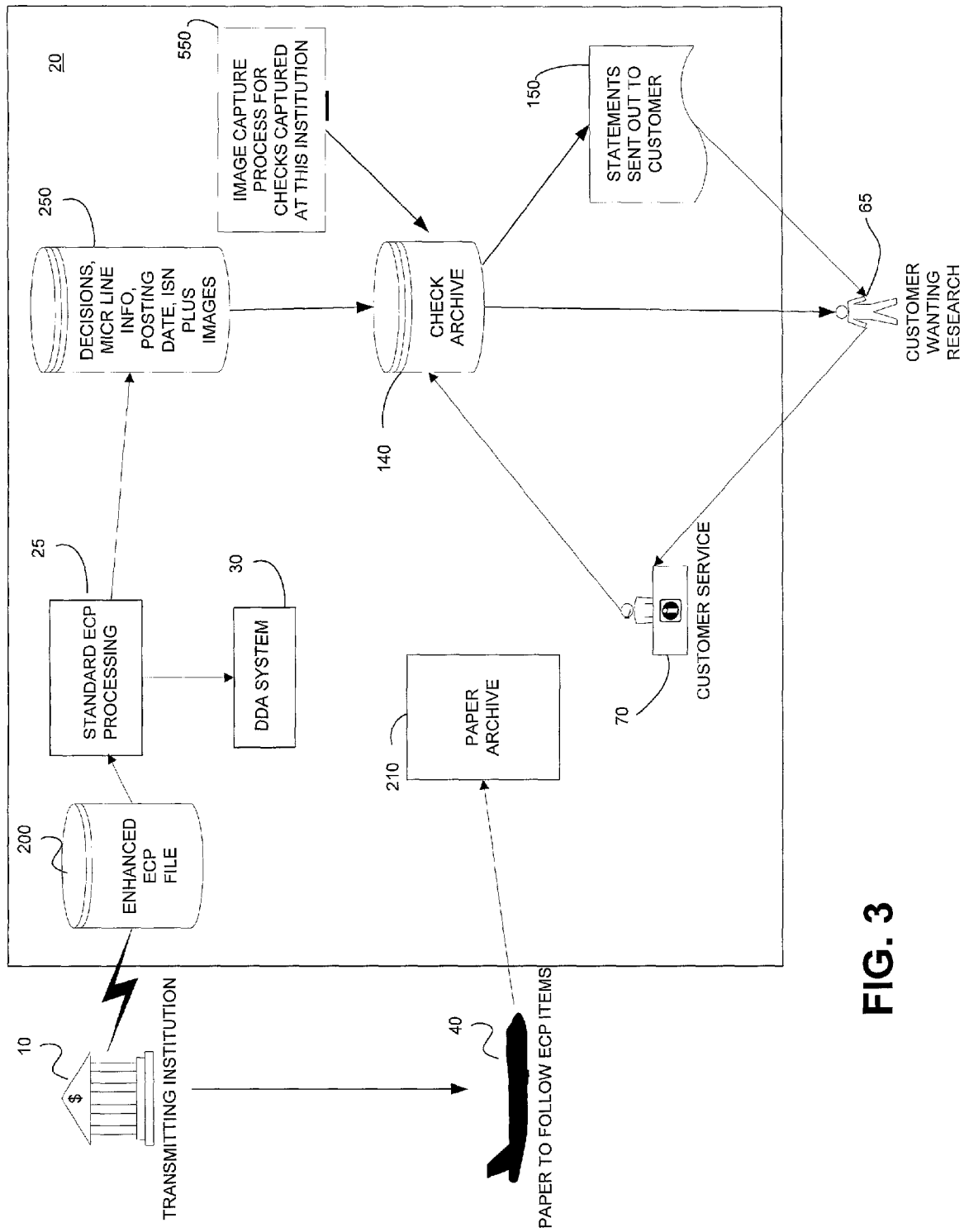
FIG. 3 illustrates a second embodiment of the present invention that eliminates two sorting and capture processes.
Figure 4:
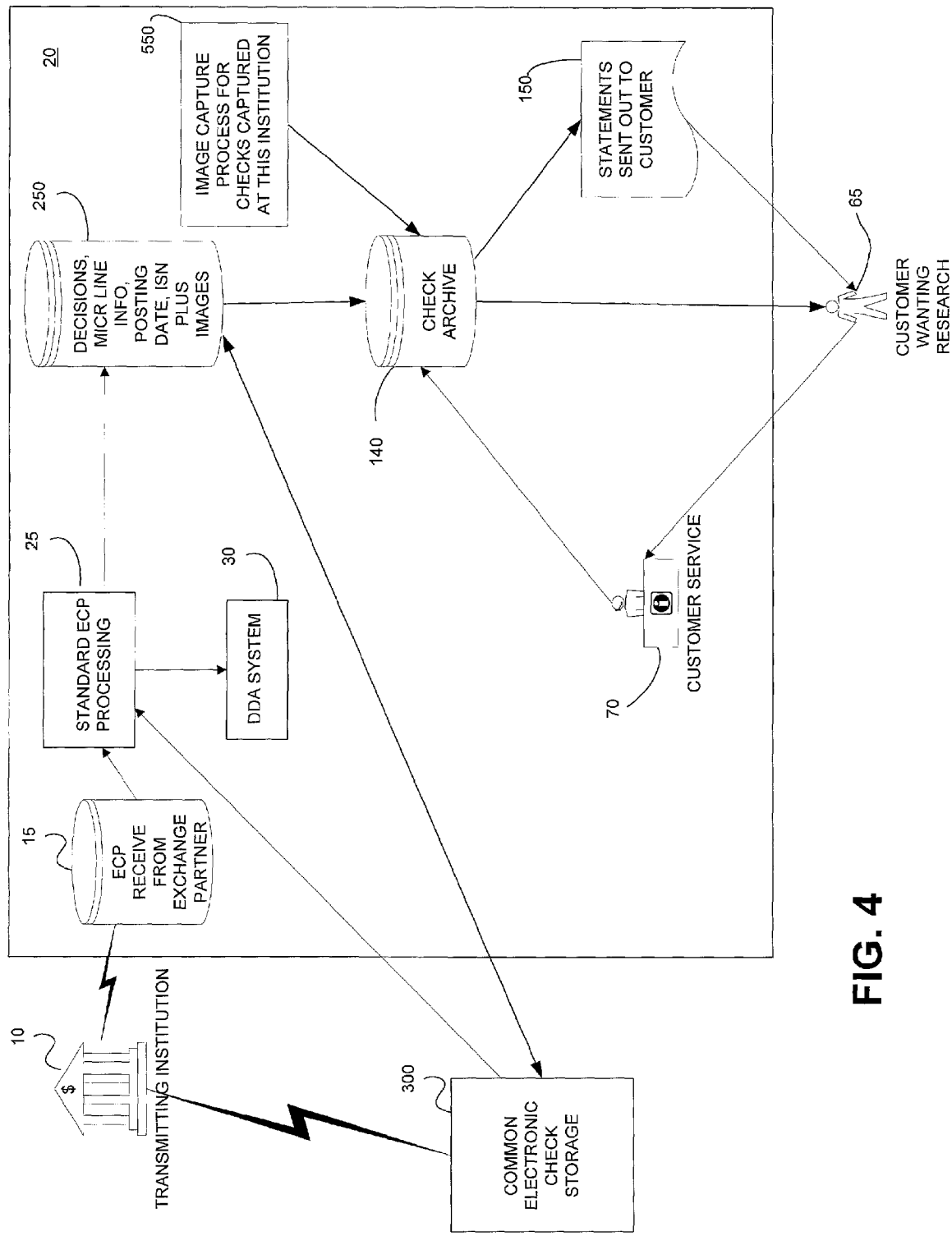
FIG. 4 illustrates a third embodiment of the present invention using a common check database for ECP items.

FIGS. 3 and 4 illustrate alternative embodiments of the present invention. In FIG. 3, it is recognized that duplicate processing takes place between the transmitting bank 10 and the receiving bank 20. The system and method illustrated in FIG. 3 eliminates this duplication. As previously described with respect to the prior art of FIG. 1, the bank 10 that generates the ECP does so by running the physical items through a sorter in order to read the MICR line off of each check. It is through this process that the bank 10 is able to determine the particular bank on which a particular check is drawn and to generate the ECPs for each of the banks to which it will be sending the paper checks. A similar sorting process (45 in FIG. 1) is performed at the receiving bank 20 once the paper checks have arrived.

In the system and method of FIG. 3, the standard capture process and the imaging of the checks (see 110 in FIG. 2) is performed by the transmitting bank and is not required to be performed by the receiving bank 20 at all. In order to accomplish this function, the transmitting bank merely has to add an imaging station in its sorter operation. In essence, the processes performed in 110 in FIG. 2 by the receiving bank 20 are all performed by the transmitting bank 10. The only real additional work required of the bank 10 is to generate the images of the physical checks and link these images to the information the bank 10 is already generating as part of the ECP.

As shown in FIG. 3, the transmitting bank transfers an enhanced ECP file 200 to the receiving bank 20 instead of the standard ECP file 15 as illustrated in FIGS. 1 and 2. The enhanced ECP file 200 contains all of the information that was contained in the original ECP file 15, plus, the enhanced ECP file 200 also contains the images of the physical items. As previously described with respect to FIG. 2, the images generated during the capture process 110 are linked to the ECP items during the proofing process 120. In the embodiment of FIG. 3, the transmitting bank 10 links the images to the ECP items, and the receiving bank 20 receives the enhanced ECP file 200 with all of the original ECP information as well as the images.

The standard ECP processing 25, the posting to the DDA system 30 each remain the same in the receiving bank 20. The one difference is that the images of the checks themselves are all carried along electronically with the ECP item information. As noted in FIG. 3, the check file 250 for this alternative process contains the images of the checks. The proofing step 120 and the sorting step 130 of the process of FIG. 2 are eliminated from the processing by bank 20 since the paper items have already been imaged and have already been linked to the ECP items. The bank 20 might wish to perform some sort of validation routine to ensure that it has received the entire file and that the transmitting bank 10 has properly imaged and linked the paper items to the ECP items. These processes and methods are well understood to those versed in the art of error detection and error correction algorithms, and it is assumed that such standard methods or techniques would be used.

After the check file 250 has been generated by the ECP processing 25, all of the linked database records and images from check file 250 are used to update the check archive 140. Previously, the database records and the images were generated separately and combined during the proofing process 120 prior to the updating of the check archive 140. In this embodiment, once the ECP processing 25 has been complete, the archive can be updated directly from file 250.

As further illustrated in FIG. 3, the transmitting bank 10 sends the physical paper items 40 to the receiving bank 20 at a later time for inclusion in the paper archive 210 at the receiving bank. To comply with banking regulations, return item processing requirements, standard practices, or other agreements, the receiving bank 20 retains the physical checks for some period before disbursing them accordingly (i.e., destroying them, returning them to the customer, etc.). As with the system of FIG. 2, the statements to the customer 150 contain a thumbnail of the images of the checks for review by the customer 65. The statements are generated out of the check archive 140. In an alternative embodiment of FIG. 3, the transmitting bank archives the paper checks on behalf of the drawee bank 20, thereby totally eliminating the need for transporting the physical items. This alternative significantly reduces the transportation costs associated with moving the paper checks from bank to bank.

FIG. 4 illustrates a further alternative embodiment of the present invention. The significant point of the embodiment illustrated in this Figure, begins with the transmitting bank 10 sending an "everything" file to a common electronic check storage 300. This everything file contains all of the bank items, even its own checks. That is to say all the ECP data records and corresponding images and any needed index information would be send to database 300, along with images and indexing information for bank 10's on-us and transit items as well.

Next, the standard ECP file 15 might be transmitted to the receiving bank 20—however, this is not strictly necessary. Note that all the necessary information has been transmitted to the common electronic check storage 300. The receiving bank 20 can thus retrieve all of the information that it requires to process ECP items from common storage 300. A minimal trigger file or notice can be sent to the receiving bank 20. This trigger file may contain index information, or some time-based coordination method could be arranged. For example, the transmitting bank 10 arranges to complete its transmission by time X, and the receiving bank 20 would retrieve its files after time X+d. Regardless of the specific practice, the drawee bank 20 accesses the common check storage facility 300 and retrieves all of the data records and images as it may need them to implement its processes (e.g., ECP processing).

One advantage of the system and method of FIG. 4 is that the transmitting bank 10 does not have to transmit an ECP file (or an enhanced ECP file containing images) to each and every receiving bank 20 for which it has ECP items. For various reasons (e.g., regulatory, existing agreements, processing capabilities of the receiving bank 20, etc.) the transmitting bank 10 may choose to send the ECP file to the receiving banks 20—however, this now becomes optional. Transmitting bank 10 can do a single transmission of all of its electronic files to a single location 300 from which the respective banks 20 can retrieve the date records and images that constitute the traditional ECP files 15 or the enhanced ECP files 200 (see FIG. 4). Naturally, access to the common storage 200 is secured such that hackers cannot gain access to the confidential financial records stored therein. Furthermore, access is controlled such that receiving banks 20 can only access the records and images of checks associated with their customers.

In a further alternative embodiment of the system and method of FIG. 4, the receiving bank can do away with its own check archive 140 and rely on the common storage 300. In this embodiment, the bank 20 is able to perform its standard ECP processing 25 from the data records retrieved from the common storage 300. Furthermore, the statements 150 to the customer 65 can be generated from the images of the checks also retrieved from the common storage 300. The difference is that once the statements 150 have been generated, the images of checks do not have to be archived in the check archive 140 maintained by the bank 20. The common storage 300 acts as the archive for all of the banks participating in the maintenance of the common storage 300.

When a customer 65 calls customer service 70 regarding an item, the customer service representative 70 is able to the access the common storage 300 in order to answer any question the customer 65 might have about the item.

Figure 5:
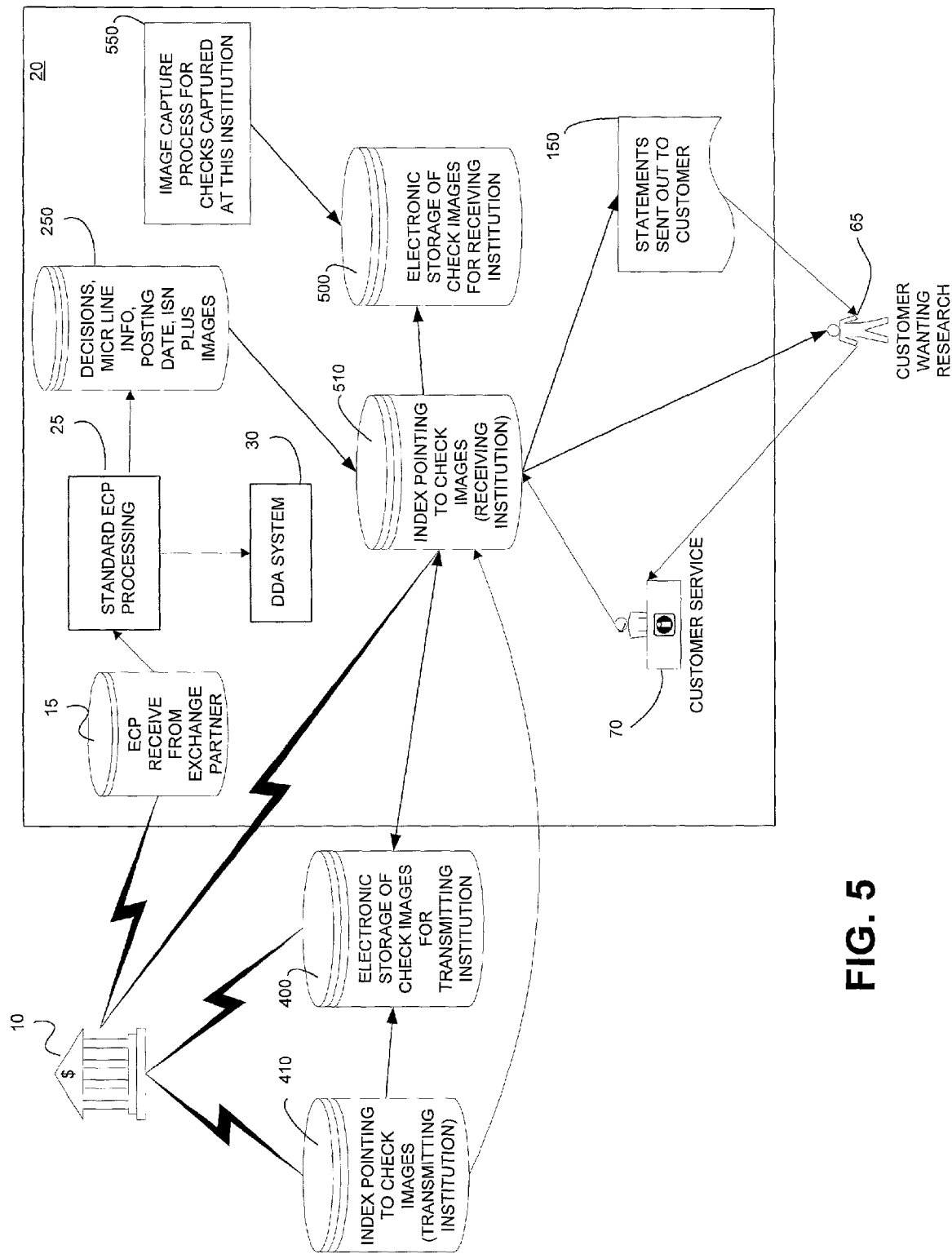
FIG. 5 illustrates a forth embodiment of the present invention using separate electronic check image databases where access to the databases are shared.

FIG. 5 illustrates an alternative embodiment of the present invention. In the embodiment illustrate in this Fig., the transmitting bank 10 stores the images in a database 400 while maintaining a separate file 410 that acts as an index. The index 410 contains pointers that indicate the location of the corresponding items in the image file 400. The receiving bank 20 maintains a similar data structure in files 500 and 510. Images that bank 20 captures from its standard processes 550 are stored in a database 500, while pointers to those images are stored in a separate index file 510.

Following the previously described process, transmitting bank 10 sends the standard ECP file 15 to the receiving bank 20. In the embodiment of FIG. 5 though, the images for the item are stored by bank 10 in storage 400 and the pointers are stored in file 410. In parallel, the transmitting bank 10 accesses the receiving bank's index of pointers contained in file 510 and adds to that index the set of pointers showing that the associated ECP images are stored in the electronic storage unit 400 of the transmitting institution 10. When statements are created 150 or customer service 70 retrieves a copy of an image, the supporting system is directed by the index 510 to the appropriate location for each image, regardless of where that image is stored—be it at the local institution's own database 500 or in the database 400 of the transmitting institution 10.

An advantage of the system and method of FIG. 5 is that the transmitting bank 10 may continue to use the standard ECP file and processes. Likewise, transmission of large image files is virtually eliminated as images are transmitted only when they are actually needed. In the embodiment of FIG. 5, only pointer and summary information is transmitted between institutions 10 and 20.

Figure 6:
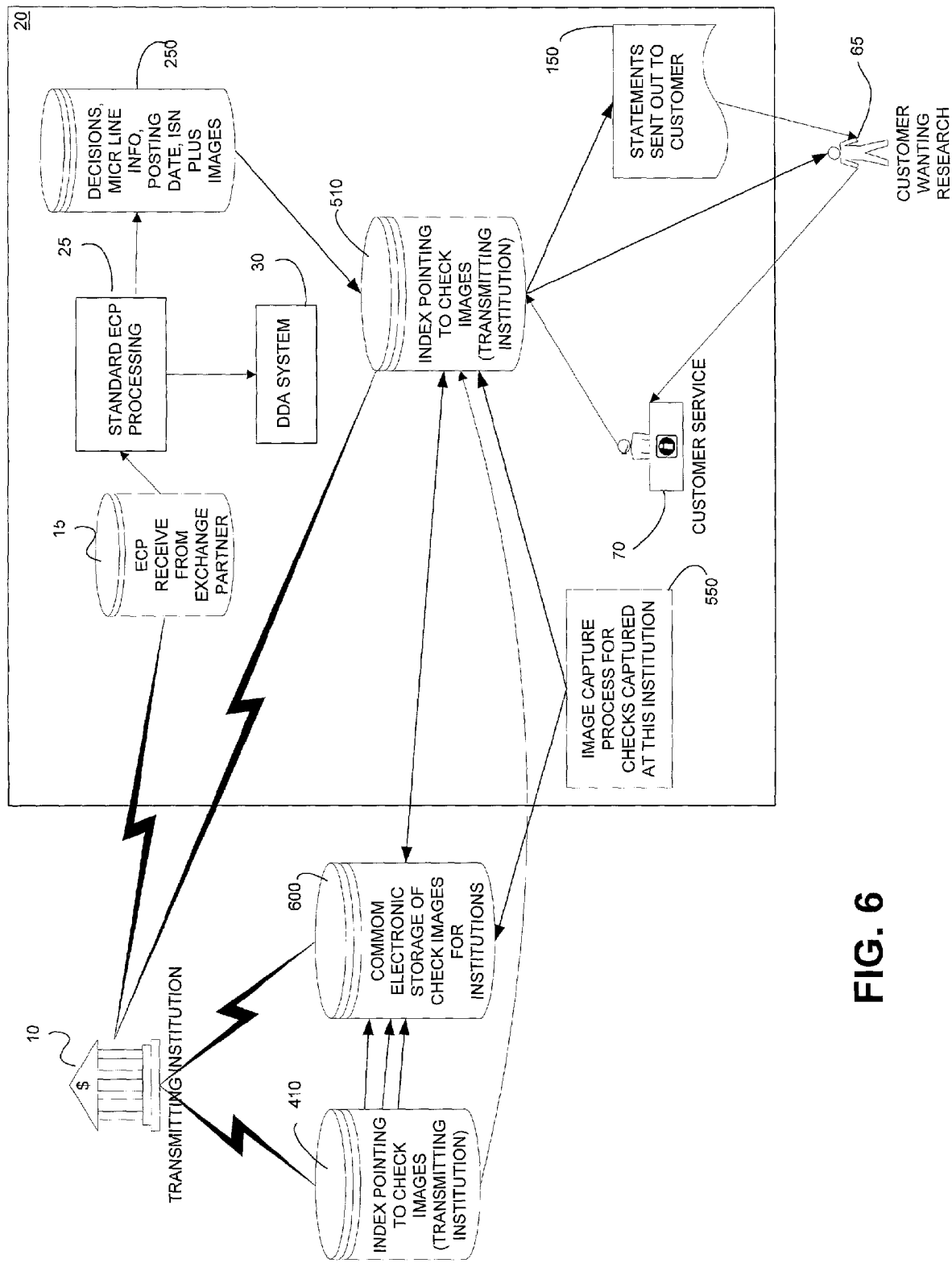
FIG. 6 illustrates a fifth embodiment of the present invention where the database of the images is a common database, and separate indexes to that database are maintained for each bank.

FIG. 6 illustrates an alternative embodiment based on the system and method of FIG. 5. If the databases 500 and 400 of FIG. 5 are maintained as a single common shared database 600, then the system embodied by FIG. 6 results. In the system of FIG. 6, the advantages associated with a shared database for storing images (like that associated with shared storage 300 of FIG. 3) may be achieved. Yet, when searching for an image, each institution 10, 20 needs to only search their own index 510. Although illustrated as being maintained by institution 20, in a further alternative, the index 510 may be maintained at the site of the shared database 600.

Naturally, access to the common storage component 600 is secured such that unauthorized users, hackers, cannot gain access to the confidential financial records stored therein. Likewise, access to shared components such as database 510 is done so only through secure means that confirms the authority of an institution to access or update this database 510.

In the embodiments of FIGS. 4-6, the institutions 10, 20, the customer service representatives 70, and even the customers 65 are able to access the common storage elements 140, 410, 500, 510 and 600 through the Internet. Again, proper security mechanisms only allow authorized users to access any of the data in any of these storage locations. In one embodiment, instead of presenting the images of the checks to the customers 65 directly in the statements 150, the customer is able to access any desired image from the place in which it is stored (e.g., common storage 600 of FIG. 6). To facilitate this process, the statement can be presented in electronic form and a Uniform Resource Locator (URL) address can be provided in the electronic statement that will link the customer 65 directly to the images of his or her checks where they are stored.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A computer implemented method for generating a digitally enhanced electronic cash presentment (ECP) file, the computer comprising a computer readable storage medium and a processor, the method comprising:
   the processor electronically generating a standard ECP file comprising a record representing a financial instrument;
   assigning a first item sequence number (ISN) to the record;
   the processor electronically generating a digital image of the financial instrument;
   assigning a second ISN to the digital image;
   the processor electronically linking the digital image to the standard ECP file by indexing the digital image with the first ISN and discarding the second ISN; and
   storing the digital image linked to the standard ECP file on the computer readable storage medium.

2. The computer implemented method for generating the digitally enhanced ECP file according to claim 1, wherein the financial instrument represents a banking transaction.

3. The computer implemented method for generating the digitally enhanced ECP file according to claim 1, wherein the financial instrument is paper-based.

4. The computer implemented method for generating the digitally enhanced ECP file according to claim 1, further comprising storing on the computer readable storage medium the linked ECP file.

5. The computer implemented method for generating the digitally enhanced ECP file according to claim 1, wherein the record comprises financial account information.

6. The computer implemented method for generating the digitally enhanced ECP file according to claim 1, wherein the record comprises bank identifying information.

7. The computer implemented method for generating the digitally enhanced ECP file according to claim 1, wherein the record comprises datum information corresponding to posting of the financial instrument.

8. A computer implemented method for processing a bank transaction, the computer comprising a computer readable storage medium and a processor, the method comprising:
generating a digitally enhanced electronic cash presentment (ECP) file, by:
the processor electronically generating a standard ECP file comprising a record representing a financial instrument;
assigning a first item sequence number (ISN) to the record;
the processor electronically generating a digital image of the financial instrument;
assigning a second ISN to the digital image;
the processor electronically linking the digital image to the standard ECP file by indexing the digital image with the first ISN and discarding the second ISN; and
storing the digital image linked to the standard ECP file on the computer readable storage medium,
transmitting the enhanced ECP file to an electronic storage unit; and
transmitting a petty ECP file to a receiving bank.

9. The computer implemented method for processing a bank transaction according to claim 8, wherein the electronic storage unit is a common electronic storage unit accessible by the receiving bank.

10. The computer implemented method for processing a bank transaction according to claim 8, wherein the petty ECP file comprises information for processing the enhanced ECP file at the electronic storage unit.

11. The computer implemented method for processing a bank transaction according to claim 8, wherein the petty ECP file comprises indexing information.

12. The computer implemented method for processing a bank transaction according to claim 8, wherein the petty ECP file comprises time-based coordination information.

13. The computer implemented method for processing a bank transaction according to claim 9, wherein the common electronic storage unit is further accessible by a plurality of other receiving banks.

14. The computer implemented method for processing a bank transaction according to claim 9, wherein access to the common electronic storage unit is limited by customer association.

* * * * *